(No Model.) 6 Sheets—Sheet 1.
T. CARNEY.
CASH REGISTER AND INDICATOR.
No. 388,825. Patented Sept. 4, 1888.

Fig. 1

Witnesses:
Albert N. Adams
Harry T. Jones.

Inventor:
Thomas Carney (No Model.) 6 Sheets—Sheet 3.

T. CARNEY.
CASH REGISTER AND INDICATOR.

No. 388,825. Patented Sept. 4, 1888.

Witnesses: Albert H. Adams. Harry T. Jones.

Inventor: Thomas Carney (No Model.) 6 Sheets—Sheet 4.

T. CARNEY.
CASH REGISTER AND INDICATOR.

No. 388,825. Patented Sept. 4, 1888.

Witnesses:
Albert H. Adams.
Harry T. Jones.

Inventor:
Thomas Carney

(No Model.) 6 Sheets—Sheet 5.

T. CARNEY.
CASH REGISTER AND INDICATOR.

No. 388,825. Patented Sept. 4, 1888.

Witnesses
Albert N. Adams
Harry T. Jones

Inventor:
Thomas Carney (No Model.) 6 Sheets—Sheet 6.

T. CARNEY.
CASH REGISTER AND INDICATOR.

No. 388,825. Patented Sept. 4, 1888.

Witnesses:
Albert H. Adams.
Harry T. Jones.

Inventor:
Thomas Carney.

UNITED STATES PATENT OFFICE.

THOMAS CARNEY, OF CHICAGO, ILLINOIS, ASSIGNOR TO MOSES BENSINGER AND HARRY G. CARNEY, BOTH OF SAME PLACE.

CASH REGISTER AND INDICATOR.

SPECIFICATION forming part of Letters Patent No. 388,825, dated September 4, 1888.

Application filed March 5, 1888. Serial No. 266,123. (No model.)

*To all whom it may concern:*

Be it known that I, THOMAS CARNEY, residing at Chicago, in the county of Cook and State of Illinois, and a citizen of the United States, have invented a new and useful Improvement in Cash Registers and Indicators, of which the following is a specification, reference being had to the accompanying drawings, in which—

My invention relates to that class of cash registers and indicators designed to be used by store-keepers and others for the purpose of accurately registering and indicating the several sums received, and to register and indicate also the total receipts.

My invention relates chiefly to improved devices for bringing into view figures which indicate the several amounts of cash received, whether cents or dollars, or both; to improved devices for registering the total amounts which have been received during any given period of time; to improved devices for registering cents less in number than five; to improved devices for ringing the bell; to a friction device to act upon the main shaft connected with the registering devices; to devices which render it impossible to ring the bell before registering the amount received, and to other devices or combinations herein specifically described and claimed. Those things which I claim as new will be pointed out in the claims.

In the drawings, A represents a suitable case in which the operating mechanism is contained. In this case there is secured a metal frame by which the principal parts of the operating mechanism are supported, as usual.

B is a rod the ends of which are fixed in the two ends of the frame.

C represents a series of keys or levers, each being provided with a hub, *a*, to furnish a bearing, each hub and lever being pivotally located upon the rod B. The outer end of each of these levers projects beyond the case, which is provided with slots to receive them, and the end of each lever is provided with a thumb-piece, *b*. There is a spring under each of these levers, as usual. A series of figures with intervals of five from 0 to 95 are located upon the case over the keys C, as shown in Fig. 1.

Figure 1:
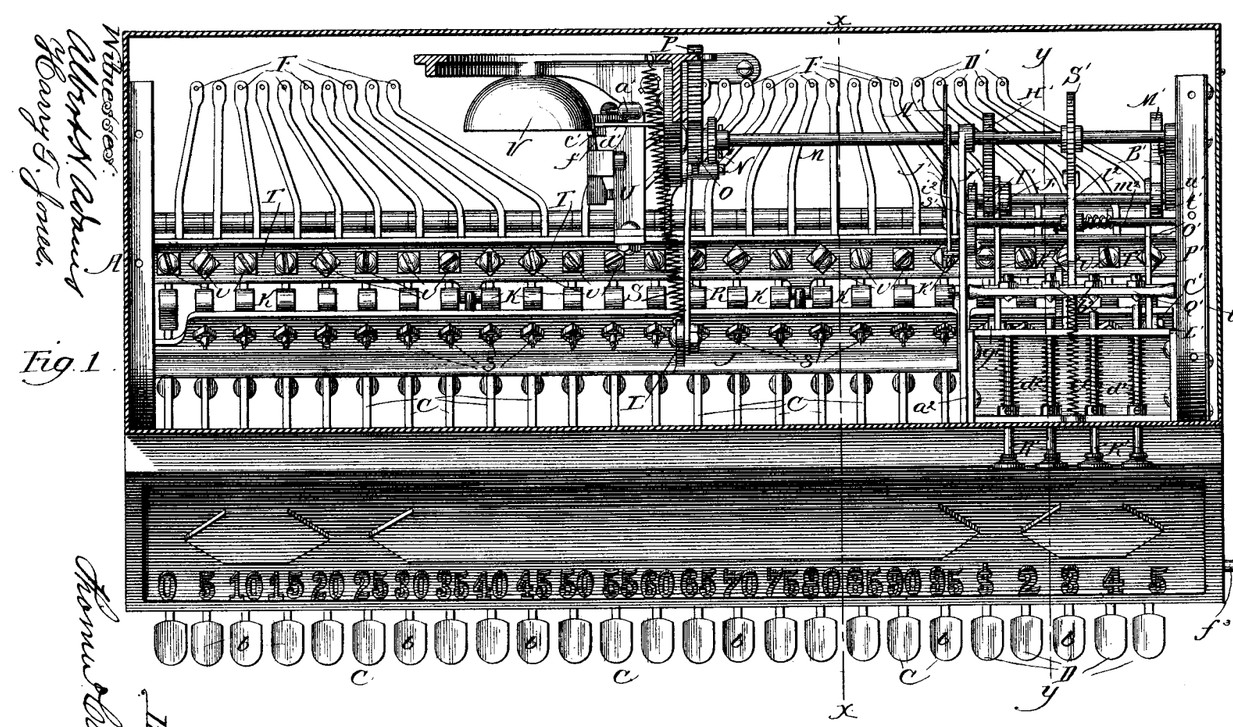
Figure 1 is a sectional plan taken at line *x x* of Fig. 2, the operating-wires being removed.

D represents a series of keys or levers similar to the levers C, pivoted upon the same shaft B, but they are used to indicate and register dollars, and on the case over such keys are a dollar-mark and figures 2 3 4 5, as shown in Fig. 1. These keys also project outside of the case and are provided with thumb-pieces. E is another rod, the ends of which are fixed in the ends of the frame.

F represents a series of levers pivoted upon the rod E. The inner short arms of the levers C are provided with pins $c$, each of which engages with a notch, $d$, in the short arm of each of the levers F.

Figures 5, 6:
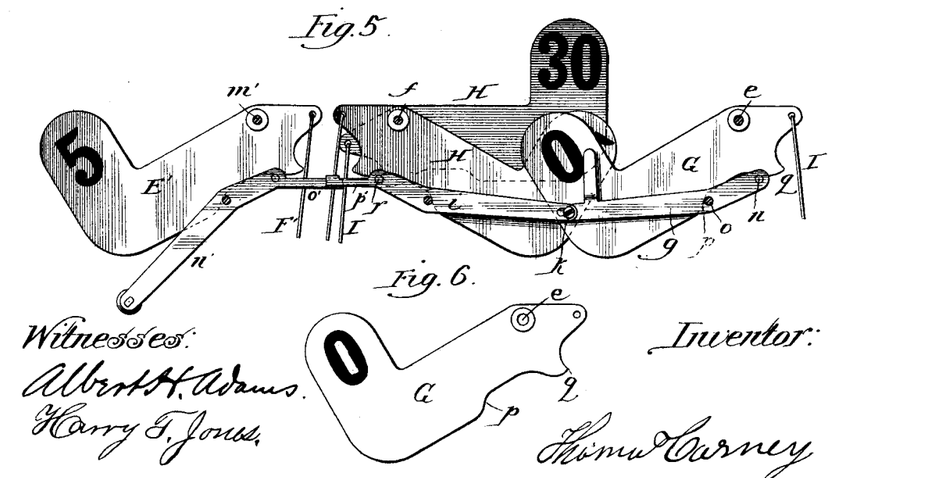
Fig. 5 is a detail, being a rear view showing the plates which carry the indicating-figures and the lever-frame in which they are supported.
Fig. 6 is a detail, being a side view of one of the plates which carry the indicating-figures.
Figure 7:
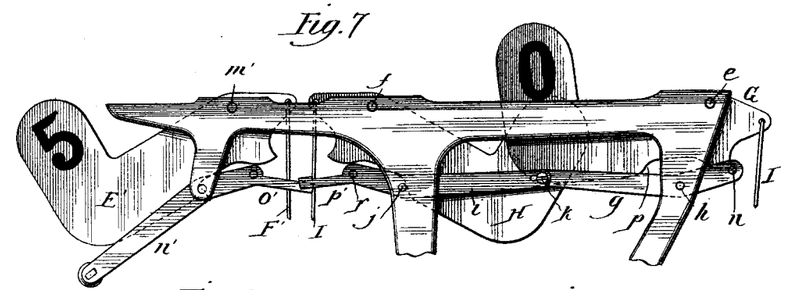
Fig. 7 is a detail, being a rear view of the parts shown in Fig. 5, and the position of the parts being different from that shown in Fig. 5, and a part of the frame being shown.

G represents a series of thin metal plates, which have the form shown in Figs. 5, 6, and 7. Each of these plates G is pivoted at $e$ upon a rod supported in the frame. The upward-extending end of each one of these plates G is provided with a figure or figures corresponding with the figures over the first ten keys C.

H represents a series of thin metal plates similar to G. They are pivoted upon a rod, $f$, in the frame, and are provided with figures corresponding with those over the keys by which they are operated.

$g$ is a lever pivoted to the frame at $h$. $i$ is another lever pivoted to the frame at $j$. The inner ends of these levers $g$ $i$ are connected by a slot and pin, as shown at $k$. These two levers are on the back side of the machine. There are two similar levers, $l$ $m$, near the front of the machine, similarly pivoted and connected. The outer ends of the two levers $g$ $l$ are connected by a rod, $n$.

$o$ is a short rod supported in the frame, on which rod the levers $g$ $l$ are pivoted. Each of the plates G is provided with a shoulder, $p$, which, when the plate is down, comes in contact with the rod $o$, which thus limits the downward movement of the plate. The outer end of each plate G is provided with a curved heel, $q$, which, when the figure on the plate is exposed, drops in behind the rod $n$, and the figure is thus held exposed until released. The plate having on it the figures 30 is shown thus held exposed in Fig. 5, and in Fig. 7 the heel of the plate, having on it a cipher, is shown just ready to pass behind the rod $n$.

Figures 2, 3:
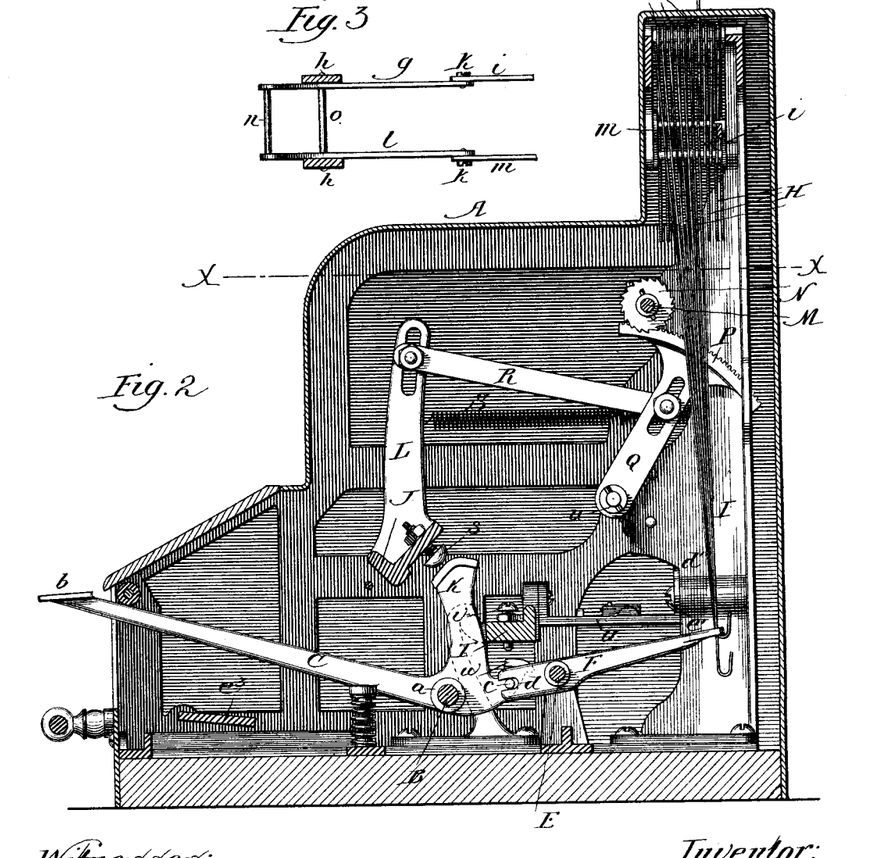
Fig. 2 is a vertical section at line *x x* of Fig. 1, looking to the left, the main operating-levers being raised to the highest point.
Fig. 3 is a detail, being a plan of the lever-frame, in which the indicating-figure plates are supported.

The plates H are of the same form as the plates G, and their downward movement is limited by a shoulder, and they are held in their exposed position in the same manner as are the plates G, there being a rod at $j$ the same as the rod $o$ in Fig. 3, and there being a rod, $r$, corresponding with the rod $n$ of Fig. 3.

I represents rods or wires which connect the outer ends of the plates G H with their operating-levers F.

J is a sway-bar pivotally supported at one end in the end of the frame at the left-hand side of the machine, as seen in Fig. 1, and the other end is supported in an upright, $a^2$, which extends up from the bed of the frame some distance from the right-hand end of the machine.

K represents arms, one of which extends upward from each of the levers C, the upper end of which is formed as shown in Figs. 1 and 2, which form is important.

$s$ represents a series of adjustable screws in the sway-bar J, with which the upper ends of the arms K are arranged to come in contact.

L is an arm extending up from the sway-bar J.

M is a shaft, one end of which is supported in a bearing near the center of the frame, and the other end is supported in one arm of the bell-crank lever B', (see Fig. 14,) which lever is located on the inside of the frame; but the shaft M extends beyond this lever and carries upon its outer end a registering-disk, $t$.

N is a ratchet-wheel on the shaft M.

O is a pinion on the shaft M, with which there is connected a spring-pawl arranged to engage with the ratchet-wheel N.

P is a segmental rack engaging with the pinion O, which rack is on the upper end of an arm, Q, which is pivoted to the frame at $u$.

R is a bar connecting the arms Q and L, which are slotted, so that the connecting-bar R can be adjusted.

S is a spring.

Figure 4:
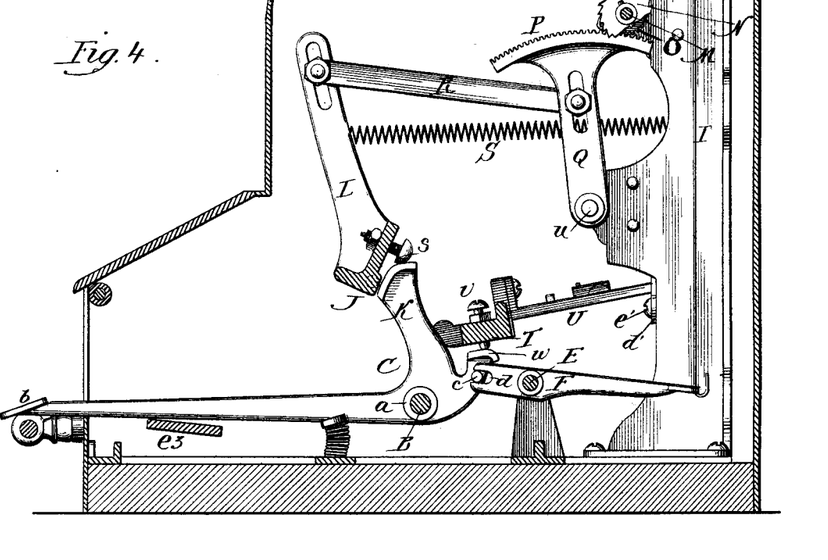
Fig. 4 is a section at line *x x* of Fig. 1, some parts being omitted, and the main operating-lever being at its lowest position, the position of some other parts being correspondingly changed.

T, Fig. 4, is a second sway-bar pivoted in the ends of the machine, and extending from one end to the other.

$v$ represents a series of adjustable screws in the sway-bar T. The lower end of each one of these screws comes in contact with a projection, $w$, on one of the levers C.

U is an arm secured to the sway-bar T.

V is a gong. (See Fig. 8.)

$a'$ is a hammer supported by a wire secured to a pivoted standard, $b'$, from the upper end of which is a projecting incline, $c'$.

$d'$ is a hook arranged to engage with the upper end of the standard $b'$, the rear end of which hook is pivoted at $e'$ to the frame.

$f'$ is a short metal bar pivoted at $g'$ to a projection from the bar or arm U. (See Fig. 9.) The forward end of this piece $f'$ is arranged to pass up under the incline $c'$ and down on the opposite side of such incline. There is a small spring, (indicated by dotted lines at $h'$, Fig. 9,) which acts upon $f'$ to throw it to the position shown in Fig. 9, after it has passed down over the right-hand side of the incline shown in Fig. 8.

Figure 8:
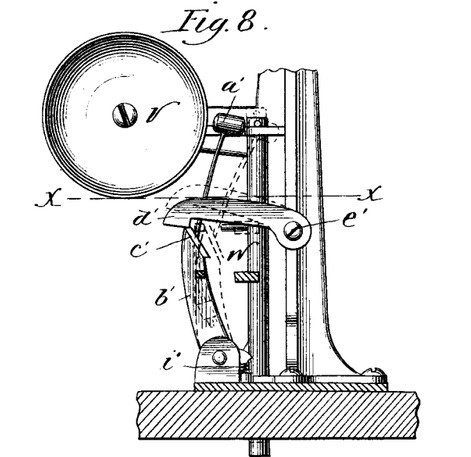
Fig. 8 is a front view of the mechanism for ringing the bell.
Figure 9:
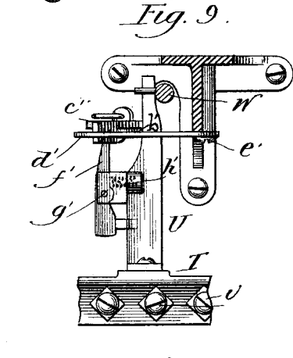
Fig. 9 is a sectional plan of the bell-operating mechanism, taken at line *x* of Fig. 8.
Figure 10:
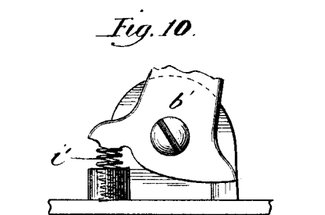
Fig. 10 is a detail, being a rear view of a portion of the bell-operating mechanism.

$i'$ is a spring which has a tendency to hold $b'$ in the position shown in Fig. 8.

W is a device used for locking the money-drawer, which is not shown, and no further description of this device will be given.

A' is a disk on the shaft M. (See Fig. 1.)

$i^2$ is a short bar, which, as shown, is hinged upon the shaft M.

Figure 11:
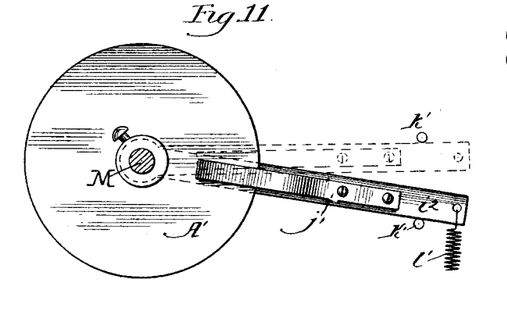
Fig. 11 is a detail, being a side elevation of the friction-disk and the friction device used therewith.

$j'$ is a spring, one end of which is secured to the bar $i^2$, and the other end rests against one face of the disk A', producing a little pressure, the object being to prevent the momentum of the shaft M from carrying it too far. These parts are shown enlarged in Fig. 11. The bar $i^2$ can move between stops $k'$ $k'$, being carried up a little by the movement of the disk A'.

$t'$ is a spring arranged to act upon the free end of the bar $i^2$.

C' is a short sway-bar pivoted in the frame. It is provided with adjusting-screws the same as the sway-bar J, with which levers D, which are similar to the levers C, come in contact.

D' represents five levers, similar in all respects to the levers F, and they are operated by the levers D in the same manner as the levers F are operated by the levers C. They are pivoted upon the shaft E the same as are the levers F.

E' represents a number of thin plates similar to the plates G and H, and for a similar purpose, except that the figures on them indicate dollars. They are pivoted in the frame at $m'$.

$n'$ is part of a lever-frame similar to that shown in Fig. 3, and for a similar purpose. This lever-frame is provided with an extended arm, $o'$.

$p'$ is a corresponding extension on the end of the lever $i$. $p'$ is provided with a hook which engages with the end of the extension $o'$.

F' represents wires which connect the inner ends of the plates E' with their operating-levers D'.

G' is a shaft. (See Fig. 15.)

H' is a segmental rack similar to P, which engages with a pinion, I', on the shaft G'. This pinion carries a spring-pawl arranged to engage with a ratchet-wheel, J', on the shaft G'.

K' is a bar through which the segmental rack H' is operated, the forward end of the bar being pivoted to an arm, $q'$, which extends upward from the sway-bar C'. These devices which operate the shaft G' are similar to those which operate the shaft M.

$r'$ is a ratchet-wheel on the shaft G', with which a pawl, $s'$, engages, the pawl being pivoted to the frame.

L' (see Fig. 14) is an arm on the sway-bar C'.

M' is a segment having a smooth surface. It is carried by the arm N', which is pivoted to the frame. The forward end, $t'$, of this part N' is in the shape of a hook.

$u'$ is a roller on the shaft G'.

O' is a bar which connects L' and N'.

P' is a case in which the registering-wheels are located.

Figure 16:
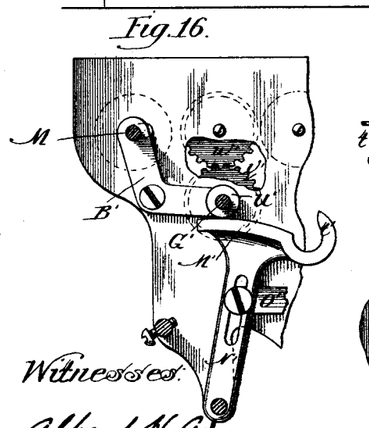
Fig. 16 is a detail showing the lever which brings the gear-wheels into position to register dollars, the position being different from that shown in Fig. 14, the section being at line *x* of Fig. 15.

$v'$, Fig. 16, is a gear-wheel on the end of the shaft G', which shaft extends into the case P'. $w'$ is another gear-wheel in the case P', the shaft of which is supported in the walls of the case P'.

Q' (see Figs. 14 and 15) is a short sway-bar, the upper edge of which is hinged in the frame.

Figure 14:
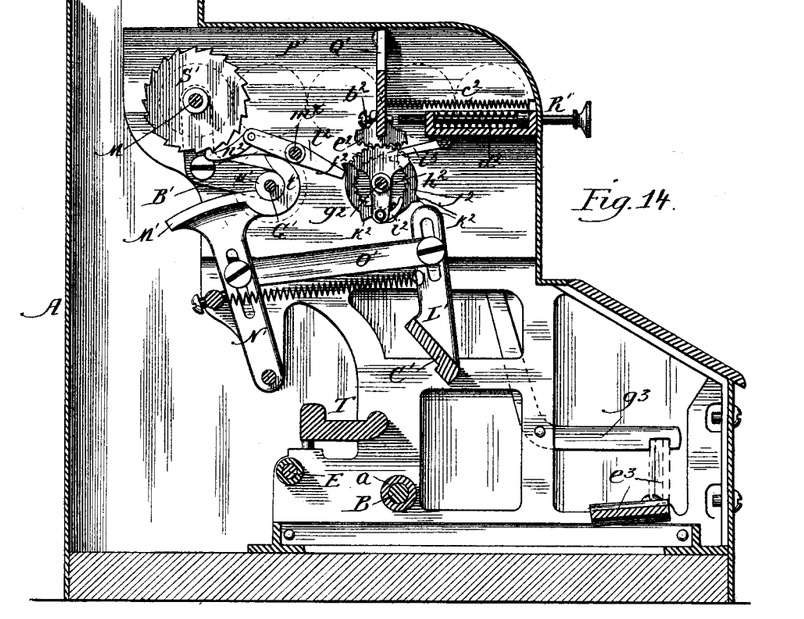
Fig. 14 is a section at line *y* of Fig. 1, looking to the right, the operating-levers being omitted, the hubs of such levers being shown in section.

$b^2$, Fig. 14, represents adjustable screws in the sway-bar Q'.

R' represents push-pins, the inner ends of which are arranged to engage with the screws $b^2$.

$c^2$ is a spring to return the sway-bar Q'.

$d^2$ represents springs to return the push-pins R'.

$e^2$ is a rack on the sway-bar Q', which rack engages with a rack, $f^2$, which is pivoted on the shaft $g^2$, the ends of which are supported in the frame.

$h^2$ is a ratchet-wheel on the shaft $g^2$.

$i^2$ is a spring-pawl, which is pivoted at the lower end of an arm which extends down from the rack $f^2$, which pawl engages with the ratchet-wheel $h^2$.

$j^2$ is a wheel on the shaft $g^2$, which wheel has four projections, $k^2$, upon its periphery.

$l^2$ is a lever pivoted on a rod, $m^2$, with one end of which lever the projections $k^2$ can engage. The other end of this lever carries a spring-pawl, $n^2$, which engages with the ratchet-wheel S' on the shaft M.

$o^2$ is a spring arranged to act on the lever $l^2$.

Figure 17:
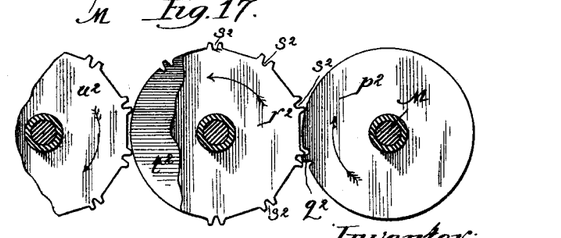
Fig. 17 is a detail, being a front elevation showing part of the wheels by which the register-wheels which indicate dollars are operated.
Figure 18:
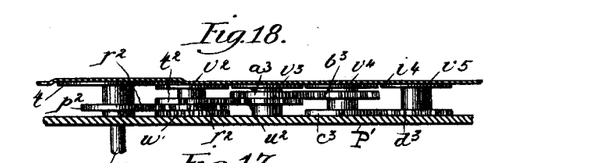
Fig. 18 is a detail, being a sectional plan showing the registry-wheels and the wheels shown in Fig. 17.

Fig. 17 shows a portion of the wheels through which the wheels which register dollars are operated, and Fig. 18 represents such wheels, and also all of the indicating-wheels except $h^3$.

The registering-disk $t$, which registers cents, has been before described. It is mounted on the shaft M, the outer end of which is supported, as before stated, in the bell-crank lever B', and the shaft passes through a slot in the case which contains the registering-wheels, which slot is shown in Fig. 16, so that the wheel $p^2$ can be brought into engagement with or be disengaged from the wheel $r^2$. The wheels $v^2$ $v^3$ $v^4$ $v^5$ are used to register, respectively, units, tens, hundreds, and thousands of dollars.

$p^2$ is a wheel upon the shaft M, which wheel has a single tooth, $q^2$, which engages with the wheel $r^2$, which is provided with ten notches, $s^2$, with which the tooth $q^2$ can engage. $t^2$ is another wheel provided with a single tooth which engages with the teeth upon the wheel $u^2$. The two wheels $r^2$ and $t^2$ are upon the same shaft which carries the disk $v^2$.

$a^3$ is a wheel similar to $p^2$, and $u^2$, $a^3$, and $v^3$ are on the same shaft.

$b^3$ is a wheel similar to $r^2$, and $c^3$ is a wheel similar to $p^2$, $b^3$, $c^3$, and $v^4$ being on the same shaft.

$d^3$ is a wheel similar to $r^2$, and $d^3$ and $v^5$ are on the same shaft.

Figures 12, 13:
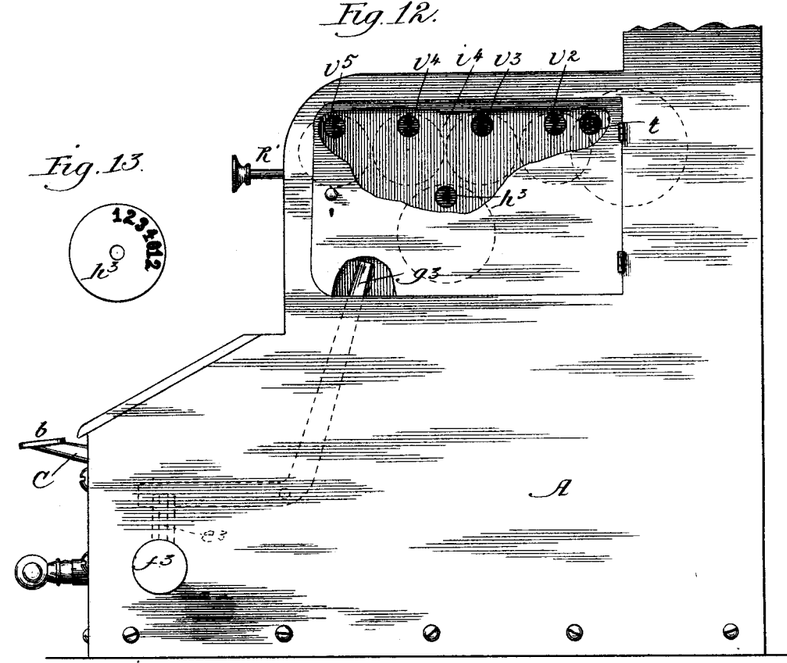
Fig. 12 is an end elevation, part of the door which covers the registering-wheels being broken away. This figure also shows, partly in dotted lines, devices for locking the operating-levers.
Fig. 13 is a detail, being a front elevation of the wheel used in indicating cents less in number than five.

In Figs. 12 and 14 I have shown a locking device, which may be used to lock the keys so that they cannot be operated, which consists of a rocking bar, $e^3$, (indicated by dotted lines in Figs. 12 and 14, and section in Fig. 4,) which, when turned up into a vertical position by means of a thumb-piece, $f^3$, will engage with a notch in a lever, $g^3$, on the inside of the case, the upper end of which extends into the case in which the registering-wheels are located, so that when the lock is in the position indicated by dotted lines in Fig. 12 the keys cannot be operated, but when the door which covers the registering-wheels is open the lever $g^3$ can be moved by hand so as to release the locking-bar $e^3$, so that it can be turned down into the position shown in Fig. 4.

Figure 15:
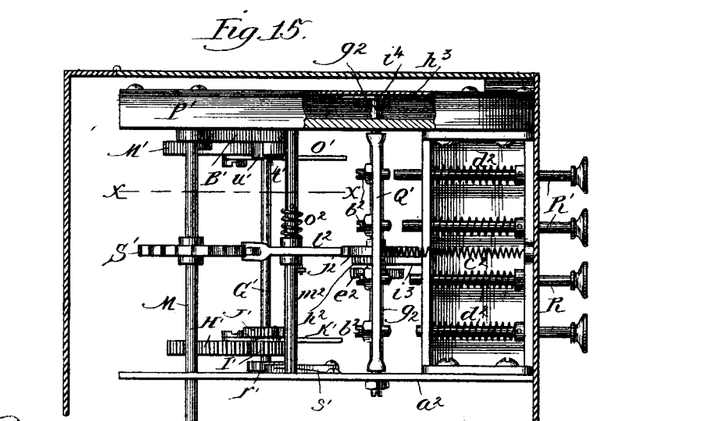
Fig. 15 is a sectional plan showing the principal parts shown in elevation in Fig. 14, which parts are used for registering a less number of cents than five.

$h^3$, Figs. 12, 13, and 15, is a wheel in the case P' and on the end of the shaft $g^2$, used to indicate cents less in number than five, and has on its face several series of figures 0 1 2 3 4.

The operation is as follows: The plates G, H, and E', which carry figures, are provided with figures on both sides so that the operator and customer can both see what figures are exposed. The first key C to the left, Fig. 1, carries a cipher, and, as shown, it does not operate any of the parts except the cipher-plate. Each of the other keys C operates one of the figure-plates which indicate cents, the devices which register cents, and the bell-striking mechanism. Suppose the key beneath the figures 30 on the front of the case be depressed. The plate H, which carries the figures 30, will be brought into the position shown in Fig. 5, bringing these figures into view. This will be done through one of the levers F and the proper connecting-wire, I. The plate, turning on its pivot at $f$, and the heel riding over the rod $r$, will depress the outer end of the lever $i$ a little, allowing the heel of the plate to come into the position indicated by dotted lines in Fig. 5, where it will be held in engagement with the rod $r$, exposing the figures on the plate. While the figures are coming into view the arm K on the lever C will come in contact with the head of the proper screw $s$ and the sway-bar J will move on its pivots, and through the arms L and R motion will be given to the rack P, and through it to the pinion O and ratchet-wheel N, partially rotating the shaft M and the registering wheel or disk $t$ on the end thereof the distance which the sway-bar J moves and the amount of rotation given to the shaft M depending upon the adjustment of the screw $s$. While the sway-bar J is being thus moved the other sway-bar, T, will also be operated through the arm $w$ on the lever C, which will lift up the bar U, and the pivoted bar $f'$, the inner end of which bar $f'$ will move up on the under side of the projection $c'$ on the pivoted standard $b'$, which carries the bell-striker, forcing the standard $b'$ back a little, and at the proper moment the arm U will lift the latch $d'$, and the end of the bar $f'$ will pass over the top of the projection $c'$, and then the bell-striker will be free to come in contact with the bell through the action of the spring $i'$. Then the bar $f'$ will ride down on the other side of the projection $c'$, and it and the standard $b'$ and the bar U will be returned to their former position. The friction-wheel or disk A' and the friction devices which operate thereon prevent the momentum of the shaft M from carrying it too far, and have the effect of stopping it at the proper point. When the next key C is operated, the corresponding figure-plate will be brought into view, and the heel of such plate will force down either the lever $g$ or the lever $i$, and the heel of the plate which was brought into view by the last preceding operation will be released and the plate will drop to its normal position. The plates G are operated by levers F and rods I in the same manner as the plates H, the heels of the plates G passing over and being held by contact with the rods $n$.

So long as the sales and amounts to be registered are less than one dollar the operation will be such as just described; but as often as the registering-disk $t$ makes one revolution the tooth $q^2$ on the wheel $p^2$ will come into engagement with one of the series of notches on the wheel $r^2$, thus registering with each such movement one dollar by moving the registering-disk $v^2$, which registers units of dollars.

I have provided devices by means of which the shaft M and the wheel $p^2$ can be moved a trifle, so that the wheel $p^2$ will not engage with the wheel $r^2$, which devices are designed to be used when registering sales which amount to one dollar or other number of even dollars up to five, which I now describe in connection with the operation of the keys which are used for indicating and registering dollars. If one of the keys D be depressed, the corresponding figure-plate, E', will be brought into position to expose the figure thereon through the corresponding lever, D', and connecting-wire F', the figure plate being brought into view and held in position, substantially as before described. At the same time the short sway-bar C' will be moved on its pivots, and through the arms L' and O' the smooth-faced segment M' will be moved from the position shown in Fig. 14 to that shown in Fig. 16, the roller $u'$ riding up over the smooth surface of the segment and causing the bell-crank lever B' to come into the position shown in Fig. 16, carrying the shaft M a little back and disengaging the wheel $p^2$ from the wheel $r^2$. This movement of the bell-crank lever will also bring the gear-wheel $v'$ on the shaft G' into engagement with the gear-wheel $w'$, as shown in Fig. 16. At the same time, through the arm $q'$ on the sway-bar C' and the connecting rod or arm K', the rack-bar H' will be moved, and through it the pinion I' and ratchet J' will be moved, giving a partial rotation to the shaft G', which carries the wheel $v'$, and movement will be given to the wheel $w'$ and to the registering disk $v^2$, and there will be registered dollars from one to five, according to which one of the keys D is used, and the bell will be rung, as before described. When the key D is released, it and the devices which operate the bell-crank lever B' and the shaft G' will be returned to their former position automatically. If the sale made be for one or more dollars and a fraction, the operator will then proceed to immediately register the cents by the use of one of the keys C, as before described, and whenever either one of these keys C is operated the levers $g$ $i$ will be moved a little, and the arm $p'$ on the outer end of the lever $i$ will press down the arm $o'$, and the exposed plate E' will be released and fall back into the position shown in Figs. 5 and 7.

I have provided devices by means of which a record can be kept of cents less than five, the registry being actually indicated when the amount reaches five. The push-pins R' are for the purpose of keeping a registry of a less number than five cents. If one of these push-pins be pushed in until it engages with one of the screws $b^2$, it will move the sway-bar $Q'$, the distance it moves depending upon the adjustment of the screws, one of the push-pins being for one cent, the next for two cents, and so on. When the sway-bar is moved, the rack $e^2$, being engaged with the rack $f^2$, will cause it to move a little distance, which will move the ratchet-wheel $h^2$ a little, and also the wheel $j^2$. Whenever one of the projections $k^2$ on this wheel $j^2$ comes in contact with the free end of the lever $l^2$, the ratchet-wheel $S'$ on the shaft M will be moved a little through the action of the spring-pawl $n^2$, and this will take place four times with each revolution of the wheel $j^2$, and every time that this lever $l^2$ is operated the shaft M and the registering-wheel $t$ will be moved far enough to register five cents.

The form of the upper ends of the arms K is important. It will be observed, Fig. 2, that the upper surface of this arm is a cam. By having this form, after the sway-bar L has been raised to its highest limit, the top of the arm K can continue to move under and against the head of the screw $s$ without continuing to move the sway-bar, and the bell-ringing devices are not brought into full action until after the sway-bar J has been raised to its highest point and the registry has been fully completed, so that it is impossible to cause the bell to ring before the registry has been made.

In Fig. 14 I have shown a retaining-pawl, $i^3$. The pawl $n^2$ also serves the purpose of a retaining-pawl for the shaft M.

The distance which the sway-bar J is moved by the action of one of the levers C depends upon the position of adjustable screws $s$, and the amount of rotation given to the shaft M depends upon the distance which the sway-bar J moves, and the sum of five cents or any multiple of five to ninety-five will be registered and indicated by the wheel $t$.

The plate $i^4$ in front of the several indicating-wheels is provided with holes to expose the several figures as they successively come in view. The figures exposed in Fig. 12 indicate five thousand three hundred and twelve dollars and sixty-four cents.

The wheel $h^3$, which indicates cents less in number than five, will be moved every time that the wheel $j^2$ is moved, the distance which the wheel $h^3$ moves being determined by the distance which the push-pins $R'$ move the sway-bar $Q'$.

What I claim as new, and desire to secure by Letters Patent, is—

1. In a registering and indicating machine, the combination, with a series of keys, C, of a number of plates, such as G H, each provided with a figure or figures and pivoted in the frame of the machine, levers, such as $g$ $i$, supports for such plates, such as rods $n$ $o$, and connections, such as levers F and wires I, between the plates and keys, substantially as set forth, and for the purpose specified.

2. In a registering and indicating machine, a series of keys, such as C, each provided with an arm, K, the upper end of which is cam-shaped, in combination with a sway-bar, J, provided with a series of adjustable screws, $s$, whereby after the sway-bar has been moved the proper distance the head of the arm K can continue to be moved, remaining in contact with the screw without moving the sway-bar, substantially as and for the purposes specified.

3. In a registering and indicating machine, the combination of a series of keys, such as C D, of a number of plates, such as G H E', each provided with one or more figures, levers, such as $g$, $i$, and $n'$, supports, such as $n$ $o$, for the plates, extensions $p'$ $o'$ on the levers $i$ $n'$, and connections, such as levers F and D' and wires I and F', between the plates and keys, all substantially as and for the purposes specified.

4. In a registering and indicating machine, the combination of a series of keys, C D, sway-bars J C', provided with adjustable screws, sway-bar T, provided with adjustable screws, levers F D', plates, such as G H E', pivoted and supported substantially as set forth, connections between the keys C D and plates G H E', such as levers F D' and wires I F', shaft M, pinion O, a ratchet-wheel, N, and a registering-disk, $t$, a movable rack-bar, P, arm L on the sway-bar J, and connecting-bar R, substantially as and for the purposes specified.

5. The combination, in a cash-register, of cent and dollar registering wheels, the registering-shafts M and G', the pivoted bell-crank lever B', supporting one end of each of said shafts, a frame in the register case supporting the other ends of said shafts, connections between the shafts and the cent and dollar registering wheels, and means for rocking the levers and rotating the shafts at will, substantially as described.

6. In a registering and indicating machine, the combination of a main registering-shaft, M, supported at one end in some part of the frame, a bell-crank lever, B', by which the other end of the shaft is supported, a smooth-faced segment, M', on the pivoted arm N', hook $t'$, a shaft, G', a roller, $u'$, keys D, sway-bar C', cog-wheel $v'$ on the shaft G', cog-wheel $w'$ on the shaft which carries the wheel $v^2$ for registering units of dollars, and intermediate devices, substantially as herein described, for giving a partial rotation to the shaft G', whereby the shaft M can be moved so that the wheel $p^2$ thereon will not engage with the wheel $r^2$ on the shaft which carries the registering-wheel $v^2$, and the gear-wheel $v'$ will at the same time be brought into engagement with the wheel $w'$ to register units of dollars, substantially as and for the purposes specified.

7. In a registering and indicating machine, the combination of push-pins R', sway-bar Q', segment or rack $e^2$, shaft $g^2$, segment or rack $f^2$, ratchet-wheel $h^2$, pawl $i^2$, wheel $j^2$, having projections $k^2$, lever $l^2$, pawl $n^2$, ratchet-wheel S', shaft M, and registering-wheel $t$, substantially as specified.

8. In a registering and indicating machine, the combination of a series of keys, as C, a sway-bar, T, carrying an arm, U, a gong, V, and bell-striker, consisting, as shown, of the two parts $a'$ $b'$, the latter carrying an inclined projection, $c'$, a pivoted bar, $f'$, and a hook, $e'$, substantially as and for the purpose specified.

9. In a registering and indicating machine, the combination of the pivoted swinging indicating-plates G H, bearing numerals and each having a heel-piece adjacent to its pivot, the levers $g$ and $i$, pivoted at points below the pivotal points of said plates and loosely connected at their adjacent ends and having cross-rods $r$ and $n$, with which the heel-pieces engage, and keys connected with those ends of the pivoted plates having the heel-pieces, substantially as described.

10. In a registering and indicating machine, the combination, with the registering devices having operating-wheels $r^2$ and $w'$, carried by the same shaft, of a rocking bell-crank lever, B', the registering-shafts M and G', having, respectively, the wheels $p^2$ and $v'$ and supported at one end by the lever, and means for locking the lever to throw the wheels on the shafts into and out of gear, respectively, with the said operating-wheels, substantially as described.

THOMAS CARNEY.

Witnesses:
E. A. WEST,
ALBERT H. ADAMS.